Oct. 1, 1929.   P. C. DAY ET AL   1,730,318
BACKSTOP FOR ELEVATORS, CONVEYERS, AND THE LIKE
Filed Feb. 20, 1926
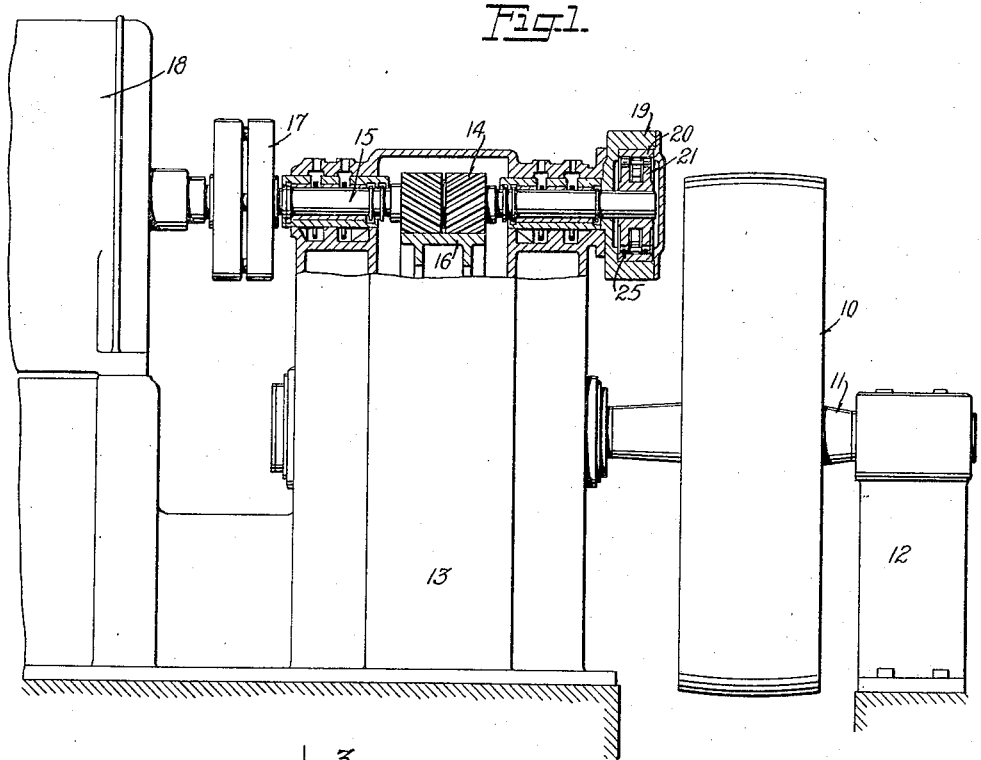
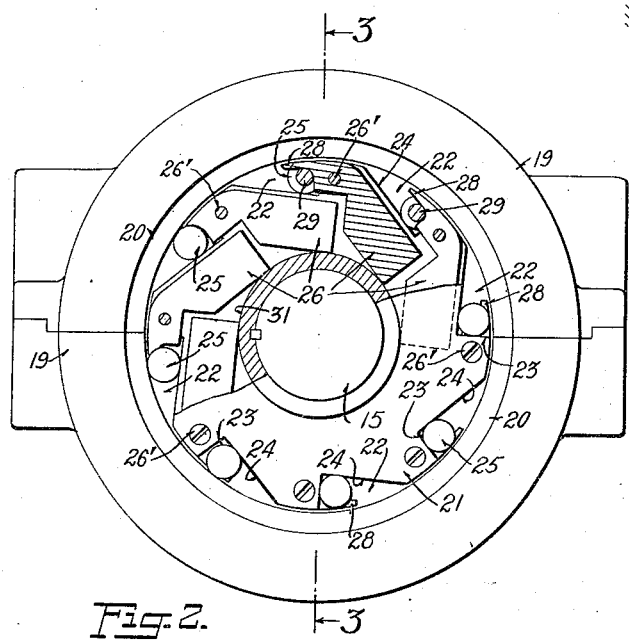
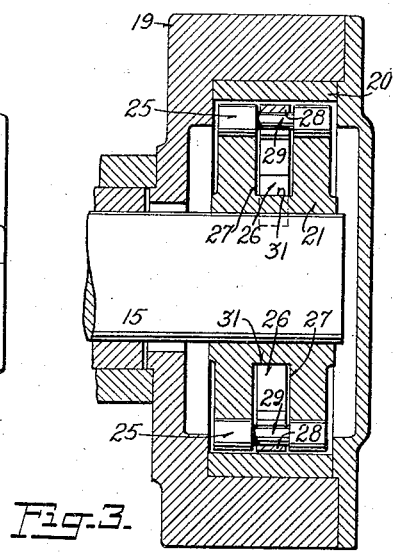
INVENTORS
PERCY C. DAY.
BY FRANK W. JURY.
ATTORNEY Patented Oct. 1, 1929

1,730,318

UNITED STATES PATENT OFFICE

PERCY C. DAY AND FRANK W. JURY, OF MILWAUKEE, WISCONSIN, ASSIGNORS TO THE FALK CORPORATION, OF MILWAUKEE, WISCONSIN, A CORPORATION OF WISCONSIN

BACKSTOP FOR ELEVATORS, CONVEYERS, AND THE LIKE

Application filed February 20, 1926. Serial No. 89,640.

This invention relates to back-stop mechanism for elevators, conveyers and the like.

Back-stop mechanisms are employed with the drives of elevators, conveyers and the like to prevent reverse operation thereof, under the influence of the load, in the event of failure in the prime mover or power source. It is highly desirable that such mechanisms be positive and prompt in action. Any material delay, which will permit reverse motion of the elevator before the back-stop comes into play, results in excessive and sometimes destructive strains in the coacting parts. It is also highly desirable that the drive mechanism be absolutely free of the back-stop mechanism under normal running conditions in order to avoid friction losses, noise, and undue wear.

The general aim of the present invention is the provision of an improved back-stop mechanism having the above mentioned desirable characteristics.

Other objects and advantages will appear from the following description of an illustrative embodiment of the present invention.

In the drawings:—

Figure 1 is an elevation, partly in section, of an elevator head equipped with a back-stop mechanism constructed in accordance with the present invention.

Fig. 2 is a side elevation, partly in section of the back-stop mechanism shown in Figure 1, with the cover plate removed.

Fig. 3 is a sectional view taken substantially on the line 3—3 of Figure 2.

The elevator head shown in Figure 1 includes the usual pulley 10 for supporting and driving the endless belt or bucket supporting medium of the elevator. The pulley is shown fixed to a shaft 11, journalled at one end in an upright bracket 12 and at the other end in a gear casing 13. The shaft 11 is driven by appropriate speed reduction gears within the casing comprising a small drive pinion 14, fixed to a drive shaft 15, and meshing with a large gear 16, fixed to the shaft 11. One end of drive shaft 15 is connected through an appropriate coulping 17 with an electric motor 18 by which it is rotated in one direction, a back-stop mechanism being associated with the other end thereof to prevent rotation in the opposite direction.

The back-stop mechanism shown comprises a stator in the form of a circular housing 19 securely fixed to the casing 13, and having a hardened bearing ring 20 anchored to the internal wall thereof. A rotor 21, fixed to the end of shaft 15, rotates freely within the ring. The rotor is formed with a series of V-shaped grooves 22 extending across the peripheral face thereof so as to provide a series of radial shoulders 23 and a series of substantially flat bearing faces 24 disposed at an acuate angle with respect to the opposed internal face of the bearing ring 20. A hardened steel roller 25 is disposed within each groove 22. The diameter of each roller is somewhat less than the maximum depth of the groove. The arrangement is such that when the rotor is at rest some of the rollers, (those on the left side of the rotor in Figure 2) rest by gravity in wedging position between the faces 24 and the internal face of the ring 20, so as to effectively prevent clockwise rotation of the rotor. Any attempt to rotate the rotor clockwise results in a firmer wedging action between these faces. The rotor is always free, however to turn counter-clockwise, since rotation in that direction urges the rollers into the deeper portions of their respective grooves.

It will be noted that during continued counter-clockwise rotation of the rotor 21, the several rollers are thrown by centrifugal force toward the ring 20. Provision is made for preventing contact of the rollers with the ring during such rotation in order to avoid wear on the rollers and ring. This is accomplished in this instance by the use of a series of levers 26 which respond to rotation of the rotor to retain the several rollers against the cooperating faces 24 of the rotor. These levers are shown housed within an annular chamber 27 formed in the median plane of the rotor. Each lever is pivotally mounted intermediate its ends upon a pin 26' fixed in the rotor. One end of each lever is provided with a nose 28 engaging within an intermediate reduced portion 29 of a roller. The other end 30 of each lever is weighted and, when the rotor is at rest, may rest by gravity upon the bottom wall 31 of the chamber 26. The arrangement is such that during counter-clockwise rotation of the rotor the weighted end of each lever is thrown out by centrifugal force so that the nose 28 thereof maintains an inward pressure upon the cooperating roller sufficient to hold the roller against the cooperating face 24 and out of contact with the ring 20. As soon as the rotor comes to rest, however, those levers 25 on the left side (Fig. 2) of the rotor fall by gravity and release their cooperating rollers so that these rollers are then free to engage between the ring 20 and the faces 25 in the manner hereinabove described.

Various changes may be made in the embodiment of the invention hereinabove described without departing from or sacrificing any of the advantages of the invention as defined in the appended claims.

We claim:—

1. In a back-stop mechanism for elevators, conveyers and the like the combination of a stator, a rotor, roller elements therebetween permitting rotation of said rotor in one direction only, and centrifugally actuated means carried by said rotor for retaining said rollers out of engagement with said stator during rotation of said rotor.

2. In a back-stop mechanism for elevators, conveyers and the like, the combination of a stator, a rotor, roller elements therebetween permitting rotation of said rotor in one direction only, and a centrifugally actuated lever associated with each element for retaining the same out of engagement with said stator during rotation of said rotor.

3. In a back-stop mechanism for elevators, conveyers and the like the combination of a stator, a rotor, a series of recesses formed in said rotor each recess presenting a surface acutely inclined relative to the coacting face of the stator, a roller element in each recess freely movable when said rotor is at rest into wedging position between said surface and face to thereby prevent rotation of said rotor in one direction, and a centrifugally actuated lever for holding each roller against said surface during rotation of said rotor in the other direction.

4. In a back-stop mechanism for elevators, conveyers or the like the combination of a rotor, a stator, a series of roller elements freely movable into wedging contact between said rotor and stator when said rotor is at rest to thereby prevent rotation of said rotor in one direction, and means rendered active by rotation of said rotor in the other direction to hold said elements out of contact with said stator.

In witness whereof, we hereunto subscribe our names this 17th day of February, 1926.

PERCY C. DAY.
FRANK W. JURY.